(12) United States Patent
Davie et al.

(10) Patent No.: US 6,978,153 B2
(45) Date of Patent: Dec. 20, 2005

(54) NON-BINDING FULLY RETRACTABLE LATCHING APPARATUS

(75) Inventors: Sean Nathan Davie, Lawrenceville, GA (US); William C. Phelps, III, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 591 days.

(21) Appl. No.: 10/020,529

(22) Filed: Dec. 15, 2001

(65) Prior Publication Data

US 2003/0114185 A1 Jun. 19, 2003

(51) Int. Cl.[7] ............................................. H04M 1/00
(52) U.S. Cl. .................. 455/550.1; 379/446; 379/118; 455/575.9; D14/253
(58) Field of Search .......................... 455/550.1, 569.1, 455/569.2, 575.1, 575.4, 575.9, 575.6; 379/446, 379/118; D14/253

(56) References Cited

U.S. PATENT DOCUMENTS

| 5,305,381 A | * | 4/1994 | Wang et al. ................. 379/455 |
| 5,481,889 A | * | 1/1996 | Richard et al. ................ 70/118 |
| 5,825,874 A | * | 10/1998 | Humphreys et al. ......... 379/446 |
| 5,863,089 A | | 1/1999 | Ignarra et al. |
| 6,002,765 A | * | 12/1999 | Frank .......................... 379/446 |
| 6,250,694 B1 | | 6/2001 | Weiland |
| 6,279,414 B1 | | 8/2001 | Moon |

* cited by examiner

*Primary Examiner*—Joseph Feild
*Assistant Examiner*—Pierre-Louis Desir
(74) *Attorney, Agent, or Firm*—Hisashi D. Watanabe

(57) ABSTRACT

This invention provides a means of coupling a detachable member, like a cellular phone for example, to a rotational member, but only when the rotational member is coupled to a base member. The invention also provides a means of presenting the detachable member to the user. In one exemplary application, the invention is coupled to a console of an automobile. The detachable member is secured to the rotational member by a retention hood at the bottom of the rotational member. A sliding latch in the rotational member has a hook that engages a detente in the detachable member when the rotational member engages the base member. The invention thus holds the detachable member in a fixedly stable position when the rotational member couples with the base member.

11 Claims, 5 Drawing Sheets

NON-BINDING FULLY RETRACTABLE LATCHING APPARATUS

BACKGROUND

1. Technical Field

This invention relates generally to retractable latching apparatus, and more specifically to a rotating, latching apparatus for mechanically coupling a device to a rotating member, but only when the rotating member is latched to a base member.

2. Background Art

Cellular phones are becoming more and more popular. Studies show that over 130 million people use cellular phones in the United States alone. Cellular phones provide a convenient way to stay in touch with friends, family and business colleagues. As technology has made the phones smaller and smaller, they can often be carried in a shirt pocket when not in use.

When a user is in an automobile, however, the small size and unique shape of today's cellular phones can be problematic. To begin, many cities and municipalities have recently passed ordinances restricting the use of cellular telephones while driving. For example, §588.03 of Westchester County, New York states, "No person shall utilize a cellular phone while operating a motor vehicle on any public street or public highway within the County of Westchester." Such laws generally include exceptions for cellular telephones equipped with "hands-free" devices. The Westchester code, for instance, states, "this law shall not be construed to prohibit a person operating a motor vehicle from utilizing a cellular phone equipped with a hands-free device."

These hands free devices sometimes take the form of an earpiece with a wire that runs to the phone, and other times take the form of a speakerphone. In either event, when using a hands-free device, the user does not hold the phone in his hand while talking. What then is the user supposed to do with the phone?

Quite often the user simply places the phone in the passenger's seat. The problem with this solution is that when the user takes a quick curve or stops suddenly, the phone can become a projectile and go flying off the seat. The user then must wait until the car is stopped to find the phone that has fallen off the seat.

In response to this issue, manufacturers of cellular accessories have developed different types of phone mounting devices. One example, as advertised on late night television, is a unit that includes sticker that attaches to the dash of the car. The unit has cantilever arms that "snap" onto the phone. In this fashion, the phone is held in a fixed position in the car.

The problem with this solution is two-fold: First, the sticker material is unattractive and can damage the dash. People who are meticulous about keeping their cars clean often do not want to attach sticker-type devices to their dashboards. Further, should they ever decide to remove the sticker, it often leaves a gummy residue on the dash.

Second, car manufacturers prefer a more ergonomic solution. When someone buys a new car, they prefer options that are designed with the user in mind. They generally are not ready to accept things that "stick" to the interior of the car.

There is thus a need for an improved means to latch portable devices, like cellular phones, to a fixed surface, like the interior of a car.

DETAILED DESCRIPTION OF THE INVENTION

Figure 1:
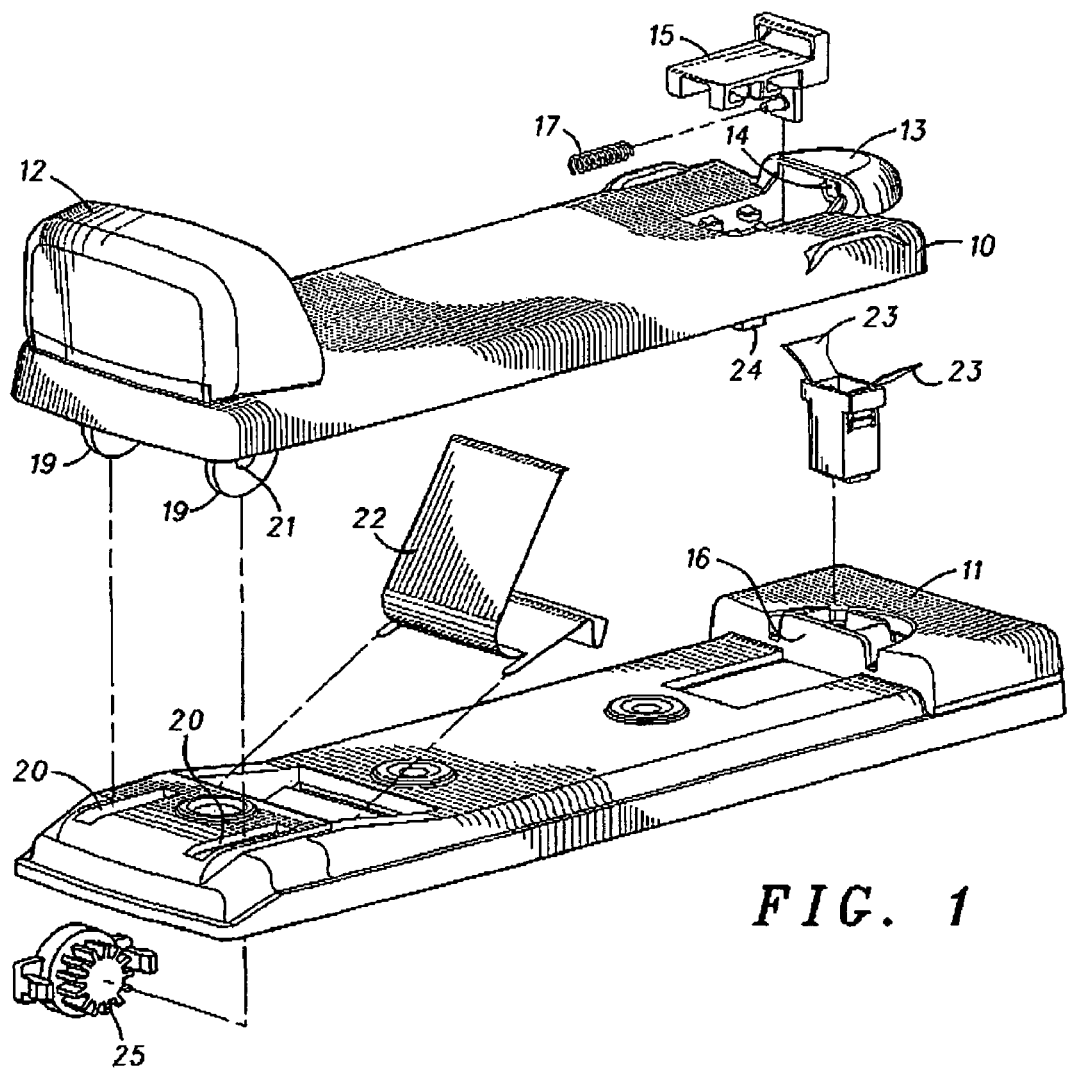
FIG. 1 is an exploded view of a rotating member and a base member, along with auxiliary components, in accordance with a preferred embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides an improved holder for coupling a detachable device to a base. The base includes a rotating member for performance-enhanced presentation of the detachable device to the user. In one exemplary application, the base member may be attached to the console of an automobile. The detachable device may be a cellular phone, which can be either stand alone or with a hands-free cradle attached. When the cellular phone is seated in the rotating member, the phone remains detachable at a convenient presentation angle to the user. When the rotating member is latched to the base, however, the phone becomes latched to the rotating member. This latching action prevents the phone from moving about while the automobile is in motion. While the exemplary application of the invention is as a holder for cellular phones, it will be obvious to those of ordinary skill in the art that the invention could equally be applied to any number of portable devices.

Referring now to FIG. 1, illustrated therein is an exploded view of a latching apparatus in accordance with the invention. The latching apparatus includes a rotating member 10 and a base member 11. The rotating member 10 includes a retention hood 12 for receiving a detachable member (not shown), as well as a latch hood 13 with a cavity 14 for receiving the sliding latch 15. As will be illustrated in later figures, the sliding latch 15 is actuated by a vertical wall 16 on the base member 11 when the rotating member 10 couples to the base member 11, and a coil spring 17 returns the sliding latch 15 to its rest position when the rotating member 10 is decoupled from the base member 11.

Figure 8:
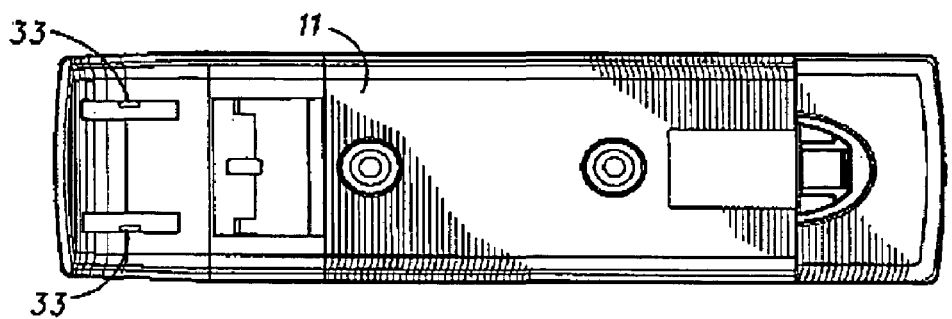
FIG. 8 is a top, plan view of a base member with a dampening spring inserted therein in accordance with a preferred embodiment of the invention.

The rotating member 10 couples mechanically to the base member 11 at one end vis-à-vis platform legs 19 that connect with base posts (shown in FIG. 8) disposed in two rectangular apertures 20 in the base member 11. The platform legs 19 each have assembly holes 21 molded therein, such that the assembly holes 20 snap about the base posts when the platform legs 19 deflect in a cantilever fashion over the base posts during assembly.

A leaf spring 22 provides a rotational force that causes the rotational member 10 to open a predetermined amount. This amount is determined by a hard stop disposed on the rotational member 10. The hard stop meets causes rotation to cease. In one preferred embodiment, the angle is between 0 and 90 degrees. The angle is preferably 25 degrees for optimum presentation of an electronic device to a user when the latching apparatus is mounted in an automotive console between the driver's and passenger's seats.

The rotating member couples mechanically to the base member 11 at the other end vis-à-vis a push-push latch 18. The push-push latch 18 has two wings 23 that spread with the push-push latch is open. When the push-push latch is closed, the wings 23 retract against an opposing spring into the push-push latch 18. In so doing, the wings 23 grasp any solid object between the wings 23 and hold it in a locked position. When the rotating member 10 is coupled to the base member 11, a latch post 24 latches between the wings 23 of the push-push latch 18. Push-push latches are known in the art in numerous forms. One such push-push latch is disclosed in U.S. Pat. No. 6,250,694, issued to Weiland on Jun. 26, 2001, which is incorporated herein by reference.

The angular acceleration generated by the leaf spring 22 when the rotating member 10 opens from the base member 11 is countered by a dampening cog 25 disposed upon the base member 10. This dampening cog 25 exerts a force that is proportional to and opposite the angular acceleration of the leaf spring 22.

Figure 2:
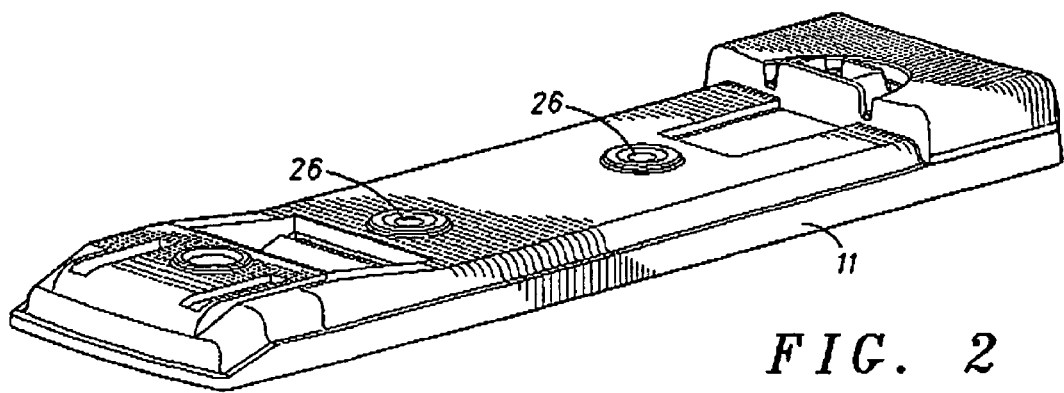
FIG. 2 is a top, right, front isometric view of a base member in accordance with a preferred embodiment of the invention.

The components of the latching apparatus, with the exception of the leaf spring 22 and the coil spring 17, are preferably molded from plastic, polycarbonate, rubber, polymers or similar materials using an injection molding process. Referring now to FIG. 2, illustrated therein is an isometric view of the base member 11. In this view, optional threaded inserts 26 are shown. These threaded inserts 26 allow easy assembly of the base member to another solid object. For example, these inserts 26 would allow the base member to be installed in the center console of an automobile.

Figure 3:
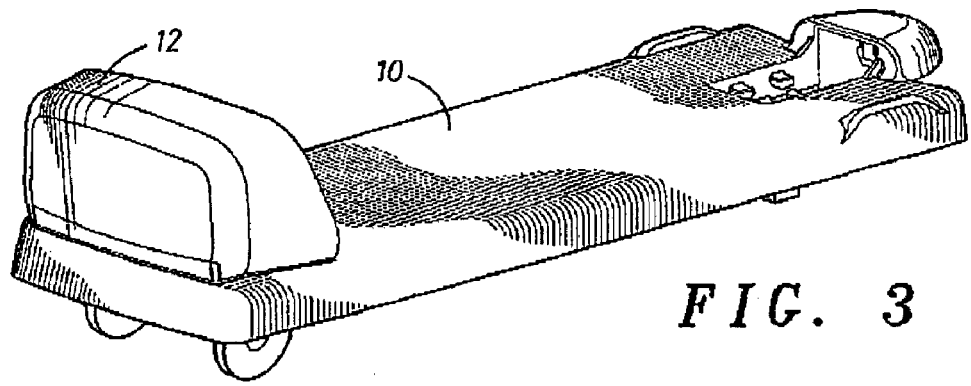
FIG. 3 is a top, right, front isometric view of a rotating member in accordance with a preferred embodiment of the invention.

Referring now to FIG. 3, illustrated therein is an isometric view of the rotating member 10. The rotating member includes a retention hood 12 into which a detachable member is inserted. One object of the invention is to fixedly latch a detachable member to the rotational member 10, but only when the rotational member 10 is coupled to the base member 11. This is achieved by inserting the bottom of a detachable member (like a cellular phone) into the retention hood 12 of FIG. 3. The retention hood holds one end of the detachable member to the rotational member.

Figure 4:
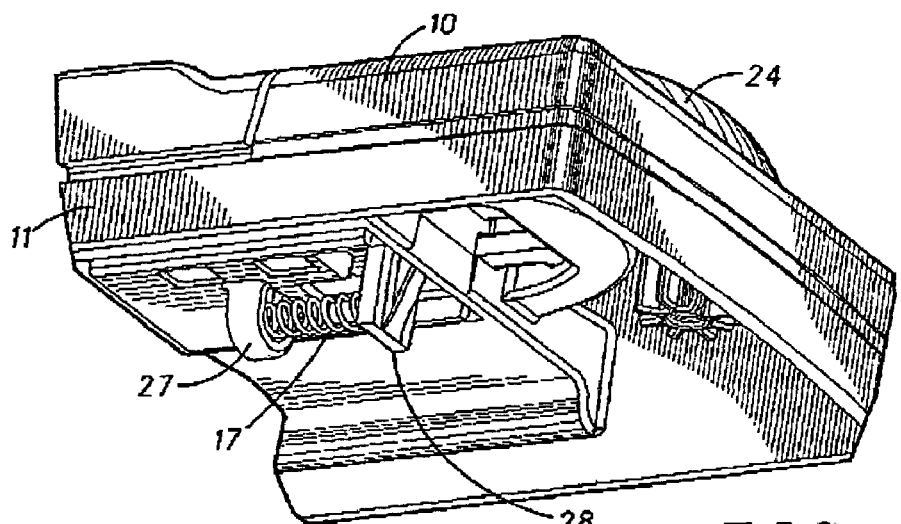
FIG. 4 is an enlarged, isometric view of a spring-actuated portion of a rotating member in accordance with a preferred embodiment of the invention.

The other end of the detachable member is coupled to the rotational member 10 by a sliding latch. Referring now to FIG. 4, illustrated therein is an enlarged view of the rotational member 10 with the sliding latch 15 and coil spring 17 inserted therein. The coil spring 17 is disposed between a coil spring receptacle 27 and the sliding latch 15. The sliding latch includes 15 includes an inclined ramp 28 that causes the sliding motion when the sliding latch engages with a vertical wall of the base member. In this view the detent 24 is also shown. The detent is for coupling with the push-push latch of the base member.

Figure 5:
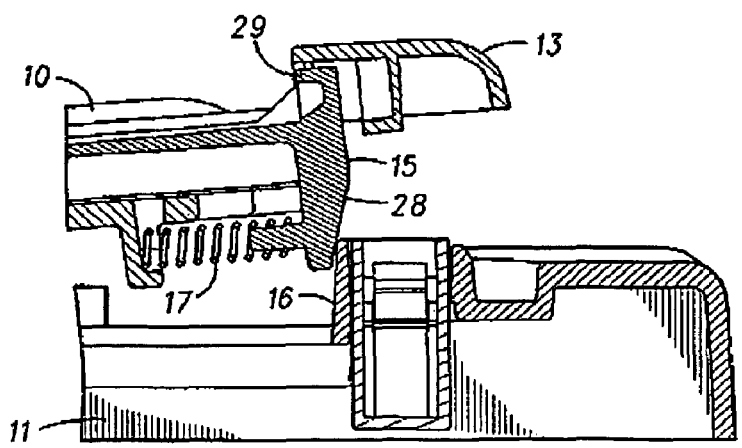
FIG. 5 is a right, elevated, enlarged view of a rotating member engaging a base member in accordance with a preferred embodiment of the invention

Referring now to FIG. 5, illustrate therein is a close up view of the sliding latch 15 engaging the vertical wall 16 of the base member 11 vis-à-vis the inclined ramp 28. This engagement causes the coiled spring 17 to compress. When the rotational member 10 is flatly against the base member, the coiled spring 17 is compressed due to the sliding latch actuation. As the sliding latch 15 has a hook 29 molded therein, the actuation of the sliding latch 15 causes the hook 29 to slide out from under the latch hood 13. When a detachable member having a detente is inserted into the rotational member 10, and further when the sliding latch 15 is actuated by coupling the rotational member 10 to the base member 11, the hook 29 slides over the detente of the detachable member to fixedly couple the detachable member to the rotational member 10. The rotational member 10 is held against the base member 11 by the latch post 24 engaging the push-push latch 18. The wings of the push-push latch 18 are not shown in this view.

Figure 6:
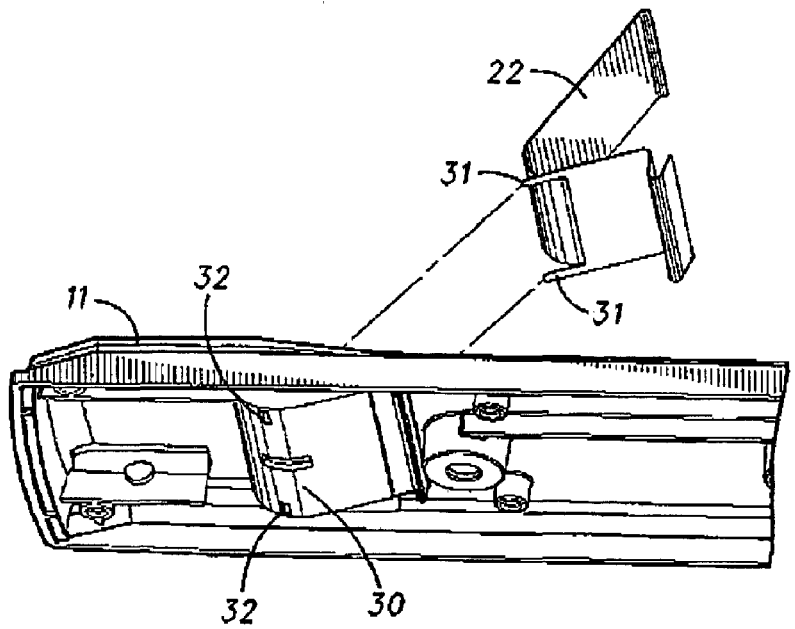
FIG. 6 is an exploded view of a base member and leaf spring in accordance with a preferred embodiment of the invention.

Referring now to FIG. 6, illustrated therein is a view of the leaf spring 22 being inserted into the base member 11. The base member 11 has a cavity 30 molded therein to receive the leaf spring 22. The leaf spring includes two prongs 31 that mate with two apertures 32 in the cavity 30 to prevent the leaf spring 22 from rotating within the base member 11.

Figure 7:
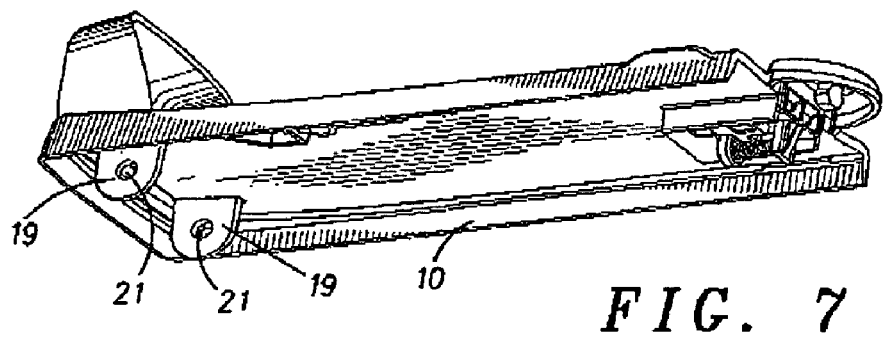
FIG. 7 is a bottom, right, rear isometric view of a rotating member in accordance with a preferred embodiment of the invention.

Referring now to FIG. 7, illustrated therein is a bottom isometric view of the rotational member 10. This figure offers a clear view of the platform legs 19 with the assembly holes 21 molded therein. The assembly legs 19 move about the base posts (element 33 of FIG. 8) in a cantilever fashion at assembly. When the assembly holes 21 engage the base posts 33, the assembly holes 21 snap about the base posts 33. When the snap occurs, the axis of the assembly hole 21 is collinear with the axis of the base posts 33. This co-linearity assures that the rotational member 10 stays mechanically coupled to the base member 11.

Figure 9:
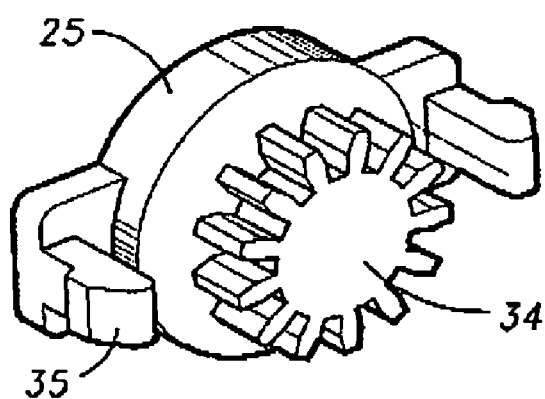
FIG. 9. is a dampening cog in accordance with a preferred embodiment of the invention.
Figure 10:
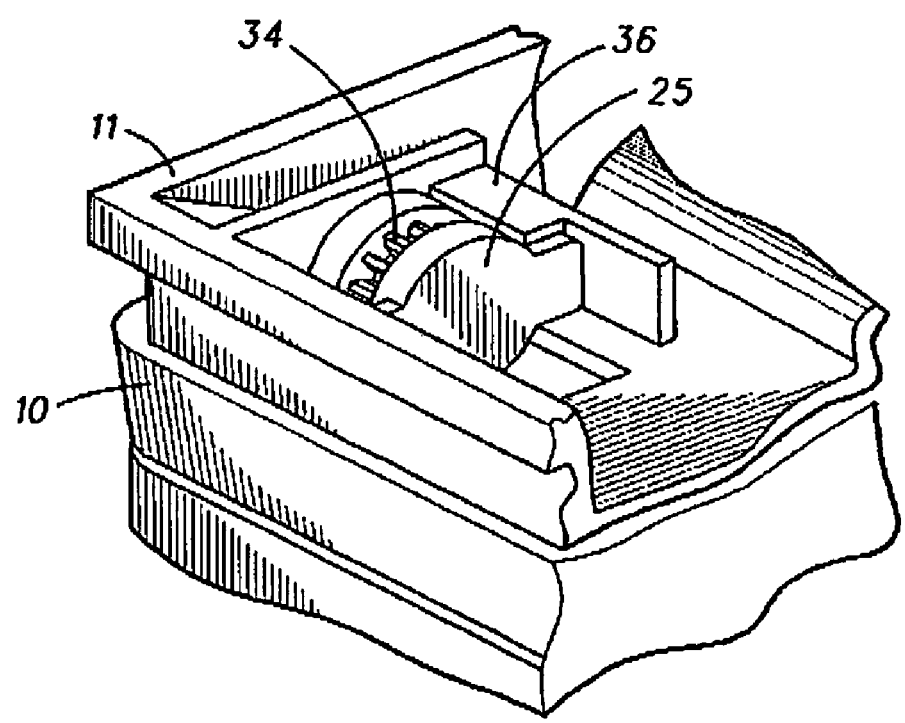
FIG. 10 is an isometric view of a dampening cog engaging a rotating member and base member in accordance with a preferred embodiment of the invention.

Referring now to FIG. 9, illustrated therein is the dampening cog 25. The dampening cog 25 has a resistive component disposed within that opposes forces placed on the teeth 34 of the dampening cog 25 in a proportional manner. The dampening cog includes cantilever latches 35 that engage with the base member, thereby allowing easy assembly without the need of glue, heat stakes, screws or other attaching means. Referring to FIG. 10, when the dampening cog 25 is inserted into the base member 11, a foot 36 coupled to the rotational member 10 engages with the teeth 34 of the dampening cog. This engagement ensures a smooth, steady opening of the rotational member 10 from the base member 11.

Figure 11:
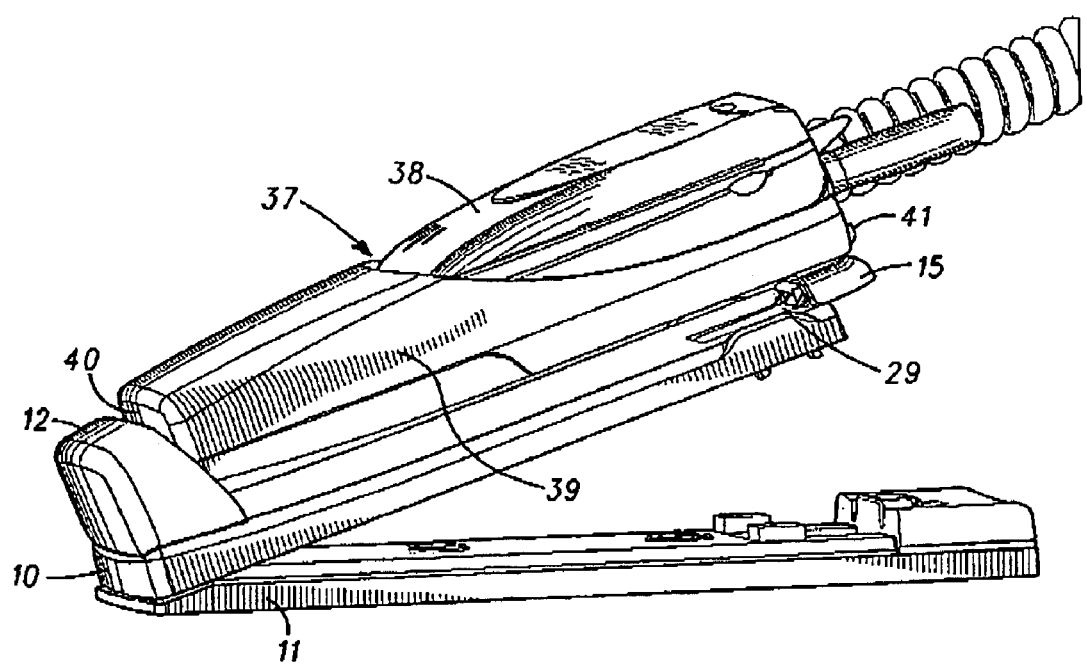
FIG. 11 is an exploded, isometric view of a detachable member being inserted into a rotating member coupled to a base member in accordance with a preferred embodiment of the invention.

Referring now to FIG. 11, illustrated therein is a detachable member 37 being inserted into the rotational member 10. In this exemplary embodiment, the detachable member 37 is shown as a cellular telephone 38 coupled to a holster 39, although those of ordinary skill in the art will find it obvious that the detachable member 37 could be cellular phone 38 alone, as well as any number of other accessories.

Figure 12:
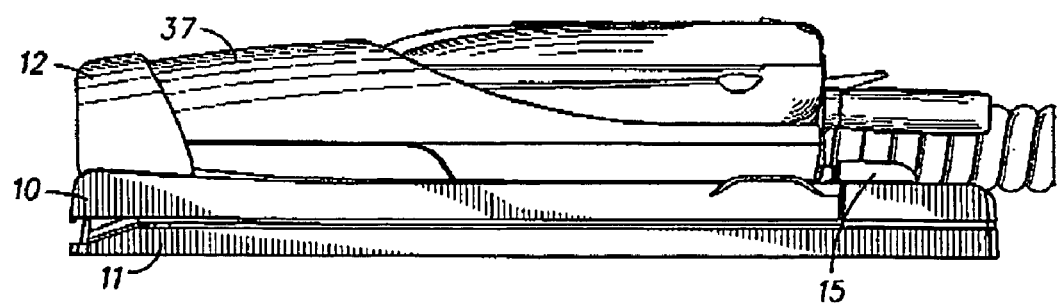
FIG. 12 is an elevated, side view of a detachable member engaged with a rotating member latched to a base member in accordance with a preferred embodiment of the invention.

As stated above, the bottom 40 of the detachable member 37 is inserted into the retention hood 12. The detachable member 37 includes a detente 41 over which the hook 29 of the sliding latch 15 slides when the rotational member 10 is coupled to the base member. Referring to FIG. 12, illustrated therein is just this situation, where the rotational member 10 is coupled to the base member 11, causing the hook of the sliding latch 15 to engage the detente of the detachable member 37, thereby causing the detachable member to be fixedly coupled to the rotational member 10.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one exemplary embodiment is for a cellular phone, it will be obvious that invention is easily adaptable to other electronic and non-electronic devices as detachable means.

What is claimed is:

1. A latching apparatus, comprising:
   a. a base member having a rotational connecting means and a latching means;
   b. a rotational member having a rotational mating means, a sliding latching means and a latching mating means; and
   c. a detachable member;
   wherein the rotational mating means is mechanically coupled to the rotational connecting means;
   wherein the detachable member is fixedly coupled to the rotational member when the latching mating means is coupled to the latching means;
   wherein the rotational member comprises a retention hood for receiving the detachable member; and
   wherein when the detachable member fixedly coupled to the rotational member, the retention hood and sliding latch hold the detachable member to the rotational member.

2. A latching apparatus, comprises:
   a. a base member having a rotational connecting means and a latching means;
   b. a rotational member having a rotational mating means, a sliding latching means, a retention hood and a latching mating means; and
   c. a detachable member;
   wherein the rotational mating means is mechanically coupled to the rotational connecting mean; and
   wherein the detachable member is fixedly coupled to the rotational member by the retention hood at one end and sliding latching means at another end when the sliding latching means is coupled to the latching means,
   wherein the sliding latching means comprises:
   a. a sliding latch;
   b. a hook mechanically coupled to the sliding latch;
   c. an inclined ramp mechanically coupled to the sliding latch; and
   d. a coiled spring coupled between the rotational member and the sliding latch.

3. The latching apparatus of claim 2, wherein the latching mating means comprises a latch post.

4. The latching apparatus of claim 3 wherein the base means has at least one vertical wall for engaging the sliding latching means.

5. The latching apparatus of claim 4, wherein the latching means comprises a push-push latch.

6. The latching apparatus of claim 5, wherein the detachable member further comprises at least one detent.

7. The latching apparatus of claim 6, wherein when the latching means engages with the latching mating means, the at least one vertical wall actuates the sliding latch such that the hook of the sliding latch engages the detent of the detachable means.

8. The latching apparatus of claim 2, wherein the base member further comprises:
   a. a leaf spring coupled to the base member; and
   b. a dampening cog coupled to the base member;
   wherein when the rotational mating means is coupled to the rotational connecting means, the leaf spring exerts a first angular force against the rotational member; and
   further wherein the dampening cog exerts a second angular force in a direction opposite that of the first angular force, and in a magnitude proportional to the first angular force.

9. The latching apparatus of claim 8, wherein the rotational mating means comprise at least one platform leg, the platform leg having at least one assembly hole.

10. The latching apparatus of claim 9, wherein the rotational connecting means comprises at least one base post.

11. The latching apparatus of claim 10, wherein the detachable member comprises a cellular telephone.

* * * * *

UNITED STATES PATENT AND TRADEMARK OFFICE
CERTIFICATE OF CORRECTION

PATENT NO. : 6,978,153 B2
DATED : December 20, 2005
INVENTOR(S) : Davie, Sean et al.

It is certified that error appears in the above-identified patent and that said Letters Patent is hereby corrected as shown below:

Column 6,
Line 2, delete "mean" and replace with -- means --.
Line 4, add "the" after "and".
Line 5, delete "sliding" (second occurrence).
Line 6, after "latching" and before "means" add -- mating --.

Signed and Sealed this

Seventh Day of March, 2006

JON W. DUDAS
*Director of the United States Patent and Trademark Office*